US008897428B2

(12) United States Patent
Walker et al.

(10) Patent No.: US 8,897,428 B2
(45) Date of Patent: Nov. 25, 2014

(54) MANAGING RECORDINGS OF COMMUNICATIONS SESSIONS

(75) Inventors: Martin Walker, Galway (IE); John Costello, Galway (IE); David Murray, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 50 days.

(21) Appl. No.: 13/538,034

(22) Filed: Jun. 29, 2012

(65) Prior Publication Data

US 2012/0271942 A1 Oct. 25, 2012

Related U.S. Application Data

(63) Continuation of application No. 11/755,198, filed on May 30, 2007, now abandoned.

(51) Int. Cl.
| | | |
|---|---|---|
| G06F 15/173 | (2006.01) |
| H04M 3/51 | (2006.01) |
| H04L 12/26 | (2006.01) |
| H04M 3/42 | (2006.01) |
| H04L 29/06 | (2006.01) |
| H04L 12/24 | (2006.01) |

(52) U.S. Cl.
CPC ............ *H04M 3/42221* (2013.01); *H04M 3/51* (2013.01); *H04L 12/2602* (2013.01); *H04L 43/00* (2013.01); *H04L 65/605* (2013.01); *H04L 41/069* (2013.01)
USPC ..... 379/88.22; 370/241; 370/352; 370/395.2; 379/32.01; 379/70; 379/88.09; 379/189; 379/265.11; 455/405; 455/412.1; 455/423; 709/219; 709/224; 709/227; 711/206

(58) Field of Classification Search
CPC .......... H04M 3/42221; H04M 1/6505; H04M 7/006; H04L 65/1059
USPC .............. 370/241, 352, 395.2; 379/70, 88.09, 379/88.19, 88.22, 115.01, 265.07, 32.01, 379/112.01, 126, 189, 207.02, 218.02, 379/265.06, 265.11; 455/405, 412.1, 423; 709/224, 219, 227; 711/206
See application file for complete search history.

(56) References Cited

U.S. PATENT DOCUMENTS

| | | | | |
|---|---|---|---|---|
| 6,246,752 | B1 * | 6/2001 | Bscheider et al. | 379/88.22 |
| 6,725,031 | B2 * | 4/2004 | Watler et al. | 455/405 |
| 6,859,526 | B2 * | 2/2005 | Macklin | 379/88.19 |
| 6,922,466 | B1 * | 7/2005 | Peterson et al. | 379/88.09 |
| 6,956,856 | B2 * | 10/2005 | Sanchez et al. | 370/395.2 |
| 7,023,979 | B1 * | 4/2006 | Wu et al. | 379/265.11 |
| 7,203,290 | B2 * | 4/2007 | Hurst | 379/115.01 |
| 7,899,178 | B2 * | 3/2011 | Williams et al. | 379/265.06 |
| 8,180,027 | B1 * | 5/2012 | Magnuson et al. | 379/88.22 |
| 8,228,898 | B2 * | 7/2012 | Everard | 370/352 |
| 8,244,877 | B2 * | 8/2012 | Yeoum et al. | 709/227 |
| 8,320,886 | B2 * | 11/2012 | Barnes et al. | 455/412.1 |
| 8,553,851 | B2 * | 10/2013 | Weir et al. | 379/70 |
| 2005/0286708 | A1 * | 12/2005 | Slosberg et al. | 379/265.07 |

(Continued)

*Primary Examiner* — Gerald Gauthier
(74) *Attorney, Agent, or Firm* — Barnes & Thornburg LLP (57) ABSTRACT

A device for recording the content of live communications sessions allocates each session with a unique identifier which is also communicated to a server, exchange, switch or endpoint having control of that session. A log of events occurring in the session is updated with the unique identifier of the recorded content, and following the session, the log of events is communicated to the recording device, indexed under the unique identifier, and stored with the recorded content of the session itself.

20 Claims, 3 Drawing Sheets

(56) References Cited

U.S. PATENT DOCUMENTS

| | | | |
|---|---|---|---|
| 2007/0263794 A1* | 11/2007 | Mocenigo | 379/67.1 |
| 2008/0298253 A1* | 12/2008 | Walker et al. | 370/241 |
| 2009/0116476 A1* | 5/2009 | Halbraich et al. | 370/352 |
| 2012/0271942 A1* | 10/2012 | Walker et al. | 709/224 |

* cited by examiner

MANAGING RECORDINGS OF COMMUNICATIONS SESSIONS

RELATED APPLICATION

This application is a continuation of co-pending U.S. patent application Ser. No. 11/755,198, filed May 30, 2007.

TECHNICAL FIELD

This invention relates to recordings of communications sessions, such as telephone and video call recordings, recordings of instant messaging and chat sessions and so on. The invention has particular application in the environment of contact centers, but is not limited to such an environment.

BACKGROUND ART

It is common practice for contact centers to record all communications involving their agents. In many industries there is a regulatory or legal requirement to archive such recordings, and even without such requirements, it is important for contact centers to retain accurate records for use in possible litigation or dispute resolution. Recorded communication sessions are also used to assist in agent training and evaluation.

In a typical contact center, a call recording device will be conferenced into each call as soon as an agent initiates the call (in the case of outbound calls), or as soon as a call is transferred to an agent (in the case of inbound calls or calls transferred from another switch forming part of the contact center organisation). The switch or call server through which the call is connected conferences in the call recording device so that the conversation between the customer and the agent is automatically recorded.

The call recording device therefore maintains a copy of the conversation which is time stamped and which may also include some additional data passed by the switch or call server, such as the directory number of the participating agent and the dialled number or the calling line identification of the customer. The switch or call server does not of course, maintain a copy of the conversation, since that is a specialised task for a call recording device. Nevertheless, the switch will typically maintain its own data records for each call, in which it notes the various events occurring such as call initiation, call termination, call transfers, on hold events, etc.

In the event that it is necessary to retrieve the recording of a call, the usual method is to use the time and date of the call to narrow down to a set of specific records. If other data, such as the telephone number of the customer, is provided to the call recording device by the switch or exchange handling the call, and if this information is stored along with the actual recording, then this can be used as a searchable field, as can the agent's directory number and so on. The task becomes considerably more difficult, however, in networked contact centers which have been built from equipment supplied by different vendors. In such cases, the degree of integration between the individual switches and call services is lower, and often only minimal data is passed to the call recording device. In such cases the call record at the call recording device is identifiable only by the time stamp information. There is, of course, no guarantee that the time stamp is accurate or that the clock in one piece of equipment is synchronized with the other pieces of equipment.

Even when the correct recording has been identified (and this normally involves listening to a number of candidate recordings to manually identify the correct one), this is usually not sufficient proof in cases where there is a dispute involving litigation. In such cases, it is imperative that an evidentiary chain can be provided to the court which positively identifies the call recording by matching it with the call switching events as recorded on the call servers, switches, exchanges or terminals of the contact center, since it is these events which are most objective and which can be directly matched against public records such as those maintained by the telephone networks.

This matching task is again made more difficult if the records of one or more of the items of equipment are incomplete or if only minimal information is passed between the various participating items of equipment, particularly in cases of multi-vendor solutions. In cases where the call recording device records are limited to a couple of time stamps, there may be insufficient data to match against the more extensive records maintained by the switch, especially if there is a mismatch between the respective clocks.

While the discussion thus far has been centred on the recording of voice calls in a contact center, it will be apparent that similar problems will arise in recording other types of communications sessions, including recording video calls, chat sessions and instant messaging sessions. Also, while the problems described have been in relation to a contact center, where there is currently the greatest need for a solution to these problems, similar problems will arise when trying to match communications session events recorded on a server or switch with an actual recording of a session on another device.

DISCLOSURE OF THE INVENTION

The invention provides a method of recording a live communications session, which includes the following steps:

(a) monitoring the session for predefined events relating to the routing and progress of the session;

(b) maintaining an events data record which records the occurrence of those events;

(c) recording the content of the session with a content recording device;

(d) upon a predetermined termination event, forwarding the events data record to the content recording device; and (e) storing the events data record at the content recording device with an identification of the recorded session content to which the events data record relates.

By communicating that events data record to the recording device so it will be stored together with the recorded content itself, the problem of finding a match between the switching events recorded for a session and the content which is remotely recorded elsewhere is overcome.

Preferably, one or more of steps (a), (b) and (d) are carried out by an item of equipment having control of the communications session.

More preferably, the communications session is a voice or video call and the item of equipment is an exchange controlling the routing of the call to an endpoint connected to the exchange.

Alternatively, the communications session may be a voice or video call and the item of equipment may be an endpoint participating in the call.

In one important application, the communications session involves a contact center and the steps (a) to (e) are carried out in items of equipment associated with the contact center.

The method preferably also includes the steps of assigning to the recorded content a unique identifier, and adding the unique identifier to the events data record.

One example of a predetermined termination event is the termination of the communications session.

Another example of a predetermined termination event is the receipt of a signal to forward the events data record.

Preferably, when the communications session continues following the predetermined termination event, steps (a) to (e) are repeated one or more times while the session remains in progress.

When the predetermined termination event is the transfer of the session from a first controlling apparatus to a second controlling apparatus, it is preferred that following the transfer, the second controlling apparatus carries out steps (a), (b) and (d).

More preferably the content recording device continues to record the content of the session as a single session before and after the transfer.

Alternatively, the content recording device records the content of the transferred session as a new record after the transfer.

Preferably, the recorded content relating to the session before and after the transfer, and the data events records from the first and second controlling apparatuses, are all stored in the content recording device such that they are identified as relating to a single session.

The invention also provides in this aspect a computer program product having instructions for execution in a computerized communications system participating in a live communications session. When these instructions are executed, they cause the system to:

(a) monitor the communications session for predefined events relating to the routing and progress of the session;

(b) maintain an events data record of the occurrence of the events;

(c) record the content of the session with a content recording device;

(d) upon a predetermined termination event, forward the events data record to the content recording device; and (e) store the events data record at the content recording device with an identification of the recorded session content to which the events data record relates.

The invention also provides a communications system for participating in a live communications session, the system including:

(a) a content recording device for recording the content of the session;

(b) a communications session events monitor for monitoring the communications session for predefined events relating to the routing and progress of the session;

(c) an events data record storage device maintaining an events data record of the occurrence of the events;

(d) a data transfer function associated with the events data record storage device for forwarding the events data record to the content recording device upon a predetermined termination event; and (e) a data management function associated with the content recording device for storing the events data record at the content recording device with an identification of the recorded session content to which the events data record relates.

The invention provides in another aspect a method of recording a live communications session, including the steps of:

(a) maintaining an events data record of switching events relating to the session in an item of equipment which monitors the session;

(b) recording the content of the session in a content recording device;

(c) assigning to the recorded content in the content recording device a unique identifier of the recorded content;

(d) communicating the unique identifier from the content recording device to the item of equipment;

(e) adding the unique identifier to the events data record to thereby provide a direct indexing between the events data record relating to the session and the recorded content of the session.

In this way, the events data record can be used to identify the recorded content or vice versa, all by means of the unique identifier associated with both records. In other words, the advantages of having matching records based on information other than simple timestamps is achieved without actually communicating the events record to the content recording device following the session.

This aspect of the invention also provides a computer program product having instructions which when executed in a computerized communications system participating in a live communications session, are effective to cause the system to:

(a) maintain an events data record of switching events relating to the session in an item of equipment which monitors the session;

(b) record the content of the session in a content recording device;

(c) assign to the recorded content in the content recording device a unique identifier of the recorded content;

(d) communicate the unique identifier from the content recording device to the item of equipment;

(e) add the unique identifier to the events data record to thereby provide a direct indexing between the events data record relating to the session and the recorded content of the session.

There is also provided a communications system for participating in a live communications session, comprising:

(a) an events data recorder for recording switching events relating to the session in an item of equipment which monitors the session;

(b) a content recording device for recording the content of the session;

(c) an identifier assignment function for assigning to the recorded content in the content recording device a unique identifier of the recorded content;

(d) a communications link for communicating the unique identifier from the content recording device to the item of equipment;

(e) a content manager associated with the events data recorder for adding the unique identifier to the events data record to thereby provide a direct indexing between the events data record relating to the session and the recorded content of the session.

In another aspect the invention provides a method of recording a live communications session including the steps of:

(a) allocating to the communications session an identifier;

(b) recording the content of the session with an indication of the identifier;

(c) communicating the identifier to an item of equipment logging events occurring in the session;

(d) receiving from the item of equipment a data record of events occurring in the session; and (e) storing the data record together with the recorded session content with an indication of the identifier.

This aspect of the invention allows the use of a separate item of events logging equipment, which is informed of the session ID which is used in the content recording device. The log of events is communicated from the data logger and stored with the recorded session content and the indication of the identifier. The stored data record and recorded session content can be stored in the content recorder or in an alternative archive.

This aspect of the invention also provides a computer program product comprising instructions which when executed in a computerized communications system participating in a live communications session, are effective to cause the system to:

(a) allocate to the communications session an identifier;

(b) record the content of the session with an indication of the identifier;

(c) communicate the identifier to an item of equipment logging events occurring in the session;

(d) receive from the item of equipment a data record of events occurring in the session; and (e) store the data record together with the recorded session content with an indication of the identifier.

There is also provided a communications system for participating in a live communications session, comprising:

(a) an identifier assignment function for assigning a session identifier to the communications session;

(b) a content recording device for recording the content of the session with an indication of the identifier;

(c) an item of equipment for logging events occurring in the session and creating a data record of the events with an indication of the identifier;

(d) a content manager for receiving from the item of equipment a data record of events occurring in the session and associating the data record with the recorded session content; and (e) a data store for storing the data record together with the recorded session content with an indication of the identifier.

DETAILED DESCRIPTION OF PREFERRED EMBODIMENTS

Figure 1:
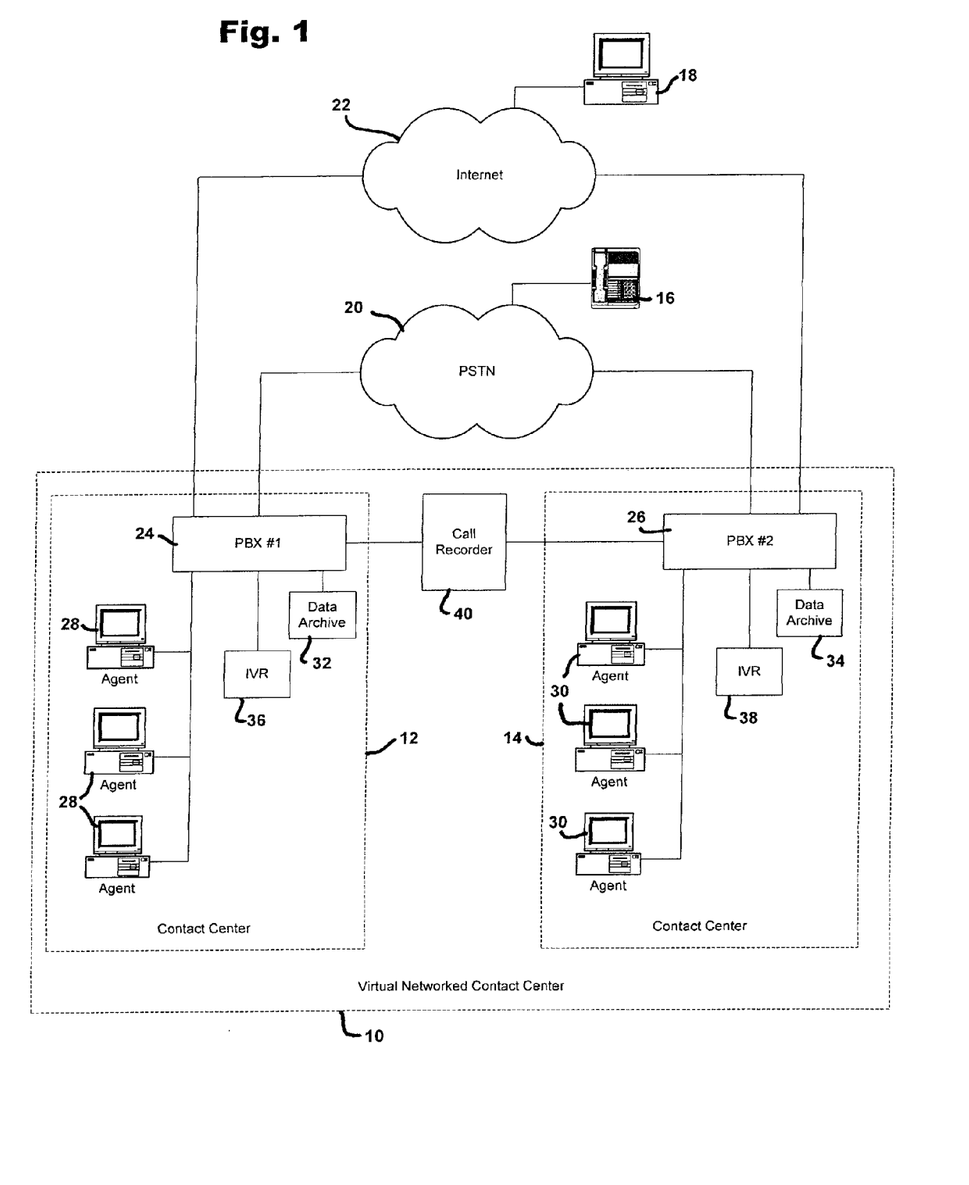
FIG. 1 is a block diagram of a networked contact center.

FIG. 1 is a block diagram showing a virtual networked contact center 10 comprising a pair of contact centers 12,14 which co-operate with one another to provide a seamless contact center as far as third parties are concerned. The contact center 10 is employed by an organisation for initiating communications with or for responding to communications from customers 16,18. The customers may connect to the contact centers 12,14 by means of the public switched telephone network (PSTN) 20, as in the case of customer 16 who employs a conventional telephone, or they may connect via the Internet 22 or some other communications network, as in the case of customer 18 who employs a computer running suitable communications software such as a Voice over Internet Protocol (VoIP) telephony software.

In addition to voice telephony, customers may engage in communications with the contact center via other live communications media such as using video calls, instant messaging, chat software and so on. Customers may furthermore interact with the contact center by means of communications which are not live (such as emails or bulletin boards) which are not considered in the scope of this invention. The ensuing discussion will focus on voice calls but it is to be understood that the same or equivalent mechanisms could be employed to record other live communications sessions.

In addition, it is to be understood that the description which follows is illustrative of a method of recording live communications sessions and of apparatuses, systems and programs for the same purpose. The actual operation of a contact center will be significantly more complicated and will employ many other systems which are not of relevance to the invention under discussion and which therefore are omitted for clarity. It should be appreciated, however, that the contact centers which are described below can be conventional contact centers in all respects which are not explicitly discussed.

Each contact center 12,14 is provided with a respective private branch exchange 24,26 (also known as a call server or a switch) which controls the routing of telephony sessions within the contact center and to and from the PSTN 20 and Internet 22. A number of agents 28,30 are connected to each contact center PBX for the purposes of engaging in live communications with customers 16,18 who initiate communication with the contact center, or to whom the agents initiate contact in the case of outgoing campaigns. The agents are typically provided with workstations having telephony capabilities and the workstations may also enable the agents to conduct instant messaging sessions, video calls, etc. to suitably equipped customers, with such communications being handled either by the PBX or by another dedicated server.

In some cases the agents may be able to make direct connections bypassing a contact center server, such as with an instant messaging client. However the workstation in such cases will normally run monitoring software for monitoring the operation of the instant messaging client in order to ensure quality control and to handle reporting tasks.

Each PBX maintains a data archive 32,34 in which it logs events relating to calls under its control. Typical events logged for each call will include the receipt of an incoming call, the dialling of an outgoing call, the placing of a call into an on-hold state, the connection of automated treatments such as interactive voice response (IVR) applications 36,38, the connection of a call to an agent workstation, the termination of a call, the transfer of a call between workstations under the control of that PBX, and the transfer of a call to an external PBX such as to the other PBX within the networked contact center. The data archive will typically also log any relevant directory numbers or external numbers or addresses associated with parties to the communications session. Finally, all such events are typically timestamped. This collection of data is the events data record for each call, and is stored in the archive, normally for a period of months or years to ensure accurate record keeping (though it may be backed up, transferred to another medium, stored offsite, etc.).

A call recording device 40 communicates with each of the PBXs 24,26 and is provided with a live feed of all calls between a customer and an agent which are under the control of the respective PBX. Typically, the PBX will be programmed to conference in the call recording device as a silent participant to the call when the agent connects to the customer (in the case of outgoing calls) or when the customer is connected by the PBX to the agent (for incoming calls). The call recorder is programmed to record and archive the conversation to which it has been connected.

Thus far, the system is a conventional one. The detailed operation of the PBXs and the call recorder, however, is not conventional and will now be described with reference to FIG. 2.

Figure 2:
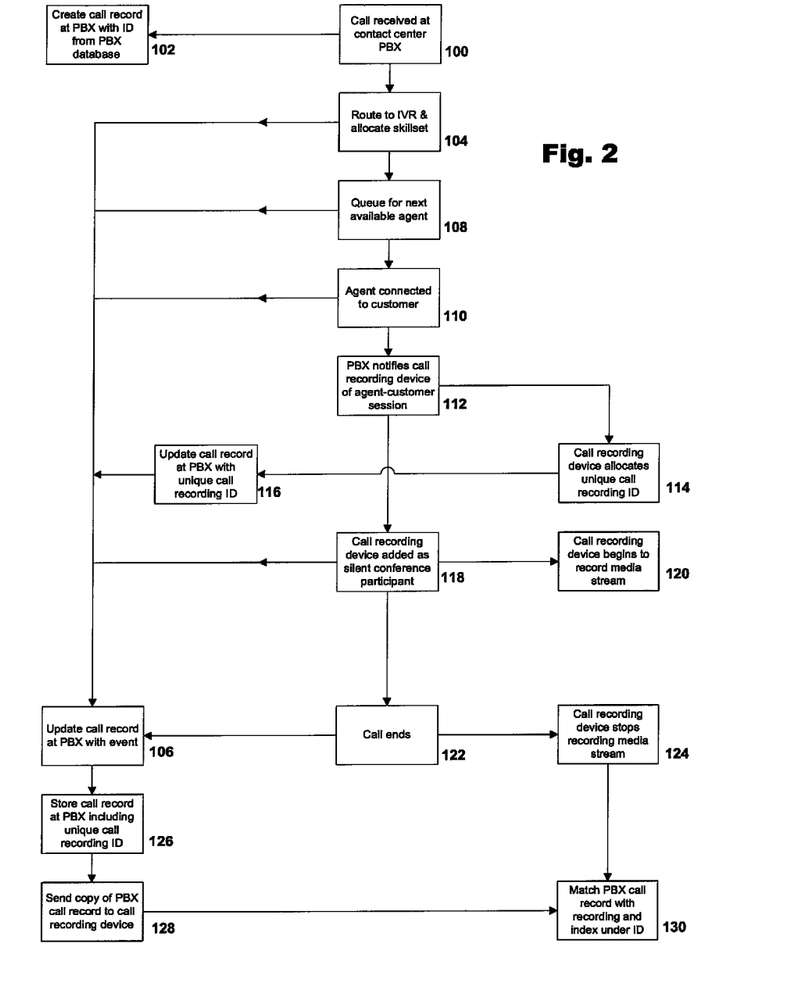
FIG. 2 is a flowchart illustrating a method of recording a communications session.

Referring to FIG. 2, when a call is received at the contact center PBX, step 100, the PBX creates a call record, assigning an identification reference from an internal database of such references, step 102. Typically in a contact center, the call is next routed to an interactive voice response application, or to some other pre-agent treatment, in order to allocate a skillset, step 104. The fact of this routing to IVR is noted in the call record or events data record maintained by the PBX, step 106.

When the appropriate skillset for the call has been determined, the call enters a queue for the next available agent with that skillset, step 108. The routing of the call to the queue is similarly noted in the events data record maintained by PBX, step 106. When an agent becomes free, that agent is connected to the customer at the other end of the call, step 110. The allocation of the call to this particular agent is once again noted by the PBX in its records, step 106.

The PBX notifies the call recording device of the new agent-customer session, step 112. This prompts the call recording device to allocate a unique call recording ID to this session, step 114, and the call recording device notifies this unique ID to the PBX which updates its own call record or events date record with this unique ID, step 116. The call recording device allocates its own identifier uniquely to every new call recording, and in the case of the described embodiment, the recording device is handling calls from two PBXs (of course there could be many more PBXs or call servers connecting to the recording device), so this ensures that every recording is identified by a unique ID following a common format, irrespective of the equipment from which the recorded call originated. (which might be equipment from multiple vendors operating to various different standards).

Because the call recording device treats all such sessions equally and simply allocates every one of the sessions a unique ID, every call record at each of the switches or exchanges within the contact center is uniquely indexed against the recording in the call recoding devices. In cases where the workstations themselves connect directly to the client (e.g. when running instant messaging clients), they can nevertheless feed the content of the instant message session to a recording device which will uniquely identify this recording.

In step 118, the call recording device is added by the PBX as a silent conference participant. The content stream of the communications session is thereby fed to the call recording device which begins to record this content stream or media stream, step 120. Once again, the addition of the call recording device as a conference participant is a routing event which is noted in the events data record maintained by the PBX, step 106. Recording continues until the call ends, step 122, another event which is noted in the call record, step 106. When the call ends, the call recording device stops recording the media stream, step 124. The call recording device and the PBX then correlate their recorded data as follows.

The events data record or call record which has been continually updated at the PBX with each significant event is stored in an archive at the PBX where it can be indexed by the unique call recording ID supplied to it by the call recording device, as well as by the ID allocated by the PBX itself, step 126. The PBX furthermore sends a copy of the call record to the call recording device, step 128. When this call record is received by the call recording device it is matched against the recording of the session content and is indexed under the unique ID allocated by the call recording device, step 130.

In this way, two aims are achieved. Firstly, the call recording device contains a complete set of records and there is no necessity to interrogate the PBX for the events which related to a particular call recording session. Secondly, and perhaps more importantly, the events data record or call record which was generated by the PBX is associated in real time with the actual recorded content and is indexed using a unique identifier from the call recording device. Should it be necessary to try to locate a particular recording beginning with the records stored by the PBX, then that unique call recording ID is also stored within the PBX archive to allow immediate retrieval of the corresponding record from the call recording device.

Figure 3:
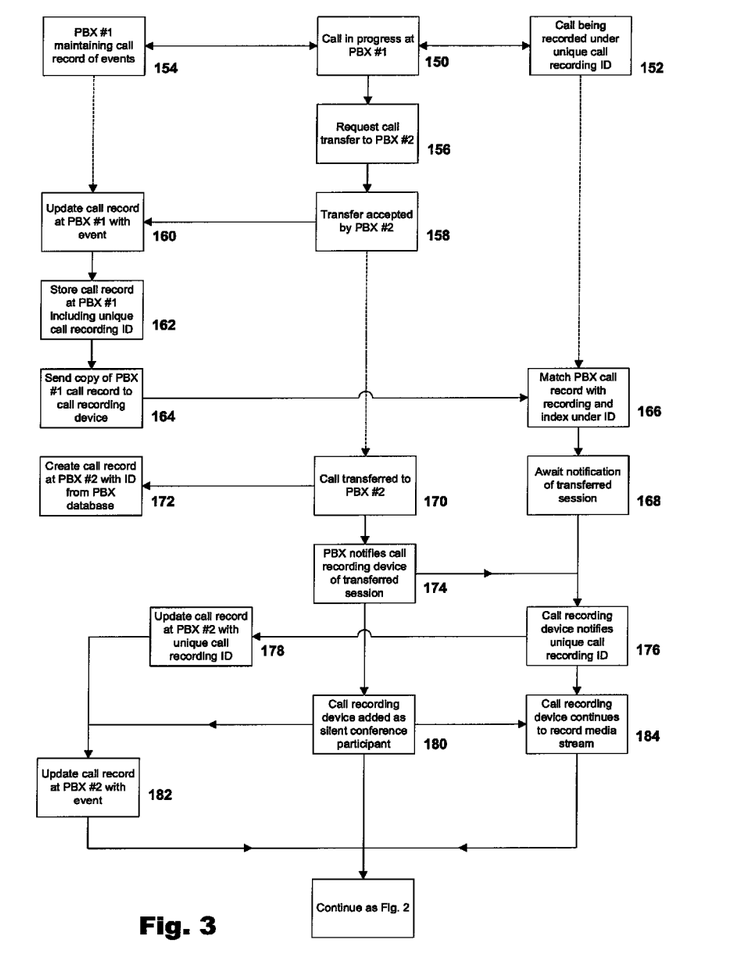
FIG. 3 is a flowchart illustrating a method of recording a communications session when the session is transferred.

FIG. 3 shows a variation on this procedure describing the sequence when a call which is being recorded in accordance with FIG. 2, is transferred to another switch or PBX forming part of the same contact center (i.e. another switch or PBX which is assigned for recording by the same call recording device).

At the start of the flowchart of FIG. 3, a call is in progress at a first PBX (PBX #1), step 150. In accordance with the process described above in relation to FIG. 2, the call is being recorded at the call recording device under a unique call recording ID, step 152. Simultaneously, PBX #1 is maintaining a call record of noteworthy events relating to the routing and progress of the call, step 154.

In step 156, a request is made to transfer the call to another PBX, denoted as PBX #2. This call transfer request may have been made by the agent handling the call, by one or other of the PBXs, or by some other contact center entity, such as a supervisor monitoring the call progress. Appropriate signalling is sent from the first PBX to the second PBX, which responds indicating that it will accept the transfer, step 158.

When PBX #2 notifies PBX #1 that it will accept the transfer, the call record at PBX #1 is updated with this event, step 160. The transfer of the call is treated by PBX #1 as a termination event as regards its own record keeping, and therefore it stores or archives its own call record, step 162, preferably indexing it under the unique call recording ID assigned by the call recording device. In similar fashion to that described at the end of the process of FIG. 2, PBX #1 sends a copy of its call record to the call recording device, step 164, and the call recording device matches the PBX call record with the recorded content for that session (thus far). The PBX call record or events data record is indexed under the unique call recording ID, step 166.

Depending on the sophistication of signalling between the PBX and the call recording device, the call recording device may be alerted that the communications session is being transferred and not terminated outright. If the call recording device is not alerted to this fact, then the process will simply terminate (as far as the call recording device is concerned) and upon transfer to the second PBX, the process would begin again in accordance with FIG. 2 as a new recording session (from the viewpoint of the call recording device). Subsequent examination of the events data record for the first part of the call, before the call transfer, would however allow ready identification of the second part of the session following the transfer, allowing the two separate recordings to be correlated However, the embodiment described in FIG. 3 is based on the premise that the call recording device is made aware that the session is being transferred rather than terminated. Accordingly, it awaits notification of the transferred session from PBX #2, step 168.

Following the acceptance of the transfer by PBX #2 in step 158, the call is actually transferred to PBX #2 from PBX #1, in step 170. PBX #2 therefore creates a call record with its own ID allocated from its own database, step 172. The PBX notifies the call recording device of the transferred session, step 174, and when the call recording device receives this notification, it responds with the unique call recording ID (i.e. the same ID which had originally been allocated to this session and had originally been notified to PBX #1, step 176. Upon notification of this unique ID, PBX #2 updates its own data events record or call record with this unique ID, step 178.

It should be noted that the data events record of PBX #2 may already have included this unique call recording device ID if the signalling between PBX #1 and PBX #2 included that ID as part of the call transfer mechanism. In such cases, the notification of the ID and the updating of the record in steps 176 and 178 may be omitted or may be used simply as a confirmation step.

Immediately following the call transfer, the call recoding device is added as a silent conference participant, step 180, and this event is noted as an update to the call record at PBX #2, step 182. Upon being added as a conference participant, the call recording device continues to record the media stream as a continuation of the recorded content for the session, step 184, so that the entire recording will be a continuous media stream beginning with the connection of the agent to the customer at PBX #1, and continuing throughout the transfer and subsequent connection to an agent at PBX #2. The process then continues as per FIG. 2, with the call recording device continuing to record the media stream, the session continuing between the customer and an end point at PBX #2, and with the call record at PBX #2 being continually updated with further events relating to the progress or routing of the call.

It is to be noted that the communications between the PBX and the call recording device may be encrypted in which case the unique recording ID itself may be passed in encrypted form in steps 114 of FIGS. 2 and 176 of FIG. 3. Similarly the passing of the events data record from the PBX to the call recording device (steps 128 and 164) can be encrypted using known encryption methods.

A further variation on the described process can be used where the call signalling for setup, transfer and termination of the call is carried out using the Session Initiation Protocol (SIP). As is well known in the art, SIP is media agnostic and thus can be used for controlling sessions of various different media types, which makes it particularly attractive for controlling communications sessions in the environment of a contact center.

SIP operates by exchanges of messages, such as an INVITE message which requests a called party to take a call, or a REFER message which is used to transfer a session to another party. Each such message complies with the SIP standard set out in the Internet Engineering Task Force (IETF) document RFC 3261, and includes various standard fields in a header which can be used to capture and pass information between the parties. There is also the option to use custom fields to carry further information. By employing such fields in the header to carry the unique identifier, messages passed between the various items of equipment, such as the call recording device, PBXs and workstations or endpoints, can inform each such item of the identifier. In the same way, the unique identifier can be carried forward when a call is being transferred from one PBX to another, thereby allowing the second PBX to note and store the unique identifier without having to receive it from the call recording device directly. The unique identifier is preferably allocated by the call recording device itself, but a SIP proxy server or indeed any SIP client might allocate the unique ID according to an agreed scheme, and this could then be used to index the session in each data storage location.

The invention is not limited to the embodiment(s) described herein but can be amended or modified without departing from the scope of the present invention.

The invention claimed is:

1. A method of recording a live communications session, comprising the steps of:
   (a) monitoring, at a first network location, the communications session for predefined events relating to the routing and progress of said session;
   (b) maintaining, at said first network location, an events data record of the occurrence of said events;
   (c) recording, at a second network location remote from said first network location, the content of said session with a content recording device as a recording of session media content which does not include said events data record;
   (d) upon a predetermined termination event, forwarding said events data record from said first network location to the content recording device at said second network location; and
   (e) storing said events data record at said content recording device with an identification of the recorded session content to which the events data record relates.

2. A method as claimed in claim 1, wherein one or more of steps (a), (b) and (d) are carried out by an item of equipment having control of the communications session.

3. A method as claimed in claim 2, wherein said communications session is a voice or video call and said item of equipment is an exchange controlling the routing of said call to an endpoint connected to said exchange.

4. A method as claimed in claim 2, wherein said communications session is a voice or video call and said item of equipment is an endpoint participating in said call.

5. A method as claimed in claim 1, wherein said communications session involves a contact center and wherein said steps (a) to (e) are carried out in items of equipment associated with the contact center.

6. A method as claimed in claim 1, further comprising the steps assigning to said recorded content a unique identifier, and adding said unique identifier to said events data record.

7. A method as claimed in claim 1, wherein said predetermined termination event is the termination of said communications session.

8. A method as claimed in claim 1, wherein said predetermined termination event is the receipt of a signal to forward said events data record.

9. A method as claimed in claim 1, wherein said communications session continues following said predetermined termination event, and wherein steps (a) to (e) are repeated one or more times while the session remains in progress.

10. A method as claimed in claim 1, wherein said predetermined termination event is the transfer of the session from a first controlling apparatus to a second controlling apparatus, and wherein, following said transfer, the second controlling apparatus carries out steps (a), (b) and (d).

11. A method as claimed in claim 10, wherein said content recording device continues to record the content of the session as a single session before and after the transfer.

12. A method as claimed in claim 10, wherein said content recording device records the content of the transferred session as a new record after the transfer.

13. A method as claimed in claim 12, wherein the recorded content relating to the session before and after the transfer, and the data events records from the first and second controlling apparatuses, are all stored in the content recording device such that they are identified as relating to a single session.

14. A computer program product comprising a non-transitory program carrier encoding instructions which when executed in a computerized communications system participating in a live communications session, are effective to cause said system to:
- (a) monitor, at a first network location, the communications session for predefined events relating to the routing and progress of said session;
- (b) maintain, at said first network location, an events data record of the occurrence of said events;
- (c) record, at a second network location remote from said first network location, the content of said session with a content recording device as a recording of session media content which does not include said events data record;
- (d) upon a predetermined termination event, forward said events data record from said first network location to the content recording device at said second network location; and
- (e) store said events data record at said content recording device with an identification of the recorded session content to which the events data record relates.

15. A communications system for participating in a live communications session comprising:
- (a) a content recording device for recording the content of said session;
- (b) a communications session events monitor for monitoring the communications session for predefined events relating to the routing and progress of said session;
- (c) an events data record storage device maintaining an events data record of the occurrence of said events;
- (d) a data transfer function associated with said events data record storage device for forwarding said events data record to the content recording device upon a predetermined termination event; and
- (e) a data management function associated with said content recording device for storing said events data record at said content recording device with an identification of the recorded session content to which the events data record relates.

16. A communications system as claimed in claim 15, wherein said communications session events monitor monitors the events occurring at a switch of a contact center with which said system is associated and wherein said switch controls said communications session.

17. A method of recording a live communications session, comprising the steps of:
- (a) maintaining an events data record of switching events relating to said session in an item of equipment which monitors the session;
- (b) recording the content of said session in a content recording device;
- (c) assigning to the recorded content in said content recording device a unique identifier of said recorded content;
- (d) communicating said unique identifier from said content recording device to said item of equipment;
- (e) adding said unique identifier to said events data record to thereby provide a direct indexing between the events data record relating to said session and the recorded content of said session.

18. A computer program product comprising a non-transitory program carrier encoding instructions which when executed in a computerized communications system participating in a live communications session, are effective to cause said system to:
- (a) maintain an events data record of switching events relating to said session in an item of equipment which monitors the session;
- (b) record the content of said session in a content recording device;
- (c) assign to the recorded content in said content recording device a unique identifier of said recorded content;
- (d) communicate said unique identifier from said content recording device to said item of equipment;
- (e) add said unique identifier to said events data record to thereby provide a direct indexing between the events data record relating to said session and the recorded content of said session.

19. A communications system for participating in a live communications session, comprising:
- (a) an events data recorder for recording switching events relating to said session in an item of equipment which monitors the session;
- (b) a content recording device for recording the content of said session;
- (c) an identifier assignment function for assigning to the recorded content in said content recording device a unique identifier of said recorded content;
- (d) a communications link for communicating said unique identifier from said content recording device to said item of equipment;
- (e) a content manager associated with said events data recorder for adding said unique identifier to said events data record to thereby provide a direct indexing between the events data record relating to said session and the recorded content of said session.

20. A method of recording a live communications session comprising the steps of:
- (a) allocating to said communications session an identifier;
- (b) recording the content of the session with an indication of said identifier;
- (c) communicating said identifier to an item of equipment logging events occurring in said session;
- (d) receiving from said item of equipment a data record of events occurring in said session; and
- (e) storing said data record together with said recorded session content with an indication of said identifier.

* * * * *